(12) United States Patent
Henley et al.

(10) Patent No.: US 7,188,805 B2
(45) Date of Patent: Mar. 13, 2007

(54) CONTINUOUS POWER BUS FOR SEAT POWER

(75) Inventors: James T. Henley, Seattle, WA (US); Robert T. Johnson, Everett, WA (US); Darrel E. Santala, Marysville, WA (US); Samuel J. Feist, Bellevue, WA (US); Trevor M Laib, Woodinville, WA (US); Bradley J. Mitchell, Snohomish, WA (US); Kevin S. Callahan, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 10/810,324

(22) Filed: Mar. 27, 2004

(65) Prior Publication Data

US 2005/0211835 A1    Sep. 29, 2005

(51) Int. Cl.
*B64D 11/00* (2006.01)
(52) U.S. Cl. .................................... 244/118.5
(58) Field of Classification Search ............. 244/118.5, 244/118.6; 297/217.3; 439/110, 112, 121
See application file for complete search history.

(56) References Cited

U.S. PATENT DOCUMENTS

| | | | |
|---|---|---|---|
| 2,031,542 A * | 2/1936 | Manchester ................. | 361/642 |
| 3,089,042 A * | 5/1963 | Hickey et al. .............. | 307/147 |
| 4,428,078 A | 1/1984 | Kuo | |
| 4,763,360 A * | 8/1988 | Daniels et al. ............. | 455/3.06 |
| 4,853,555 A * | 8/1989 | Wheat ........................ | 307/9.1 |
| 5,409,186 A * | 4/1995 | Chow ..................... | 244/122 R |
| 6,033,097 A * | 3/2000 | Harwood .................... | 362/404 |
| 6,290,516 B1 * | 9/2001 | Gerber ....................... | 439/110 |
| 6,325,645 B1 * | 12/2001 | Schuite ....................... | 439/110 |
| 6,601,798 B2 * | 8/2003 | Cawley .................... | 244/118.6 |
| 6,619,588 B2 * | 9/2003 | Lambiaso ................ | 244/118.5 |
| 6,824,104 B2 * | 11/2004 | Smallhorn ............... | 244/118.5 |

* cited by examiner

*Primary Examiner*—Tien Dinh
(74) *Attorney, Agent, or Firm*—Harness, Dickey & Pierce, P.L.C.

(57) ABSTRACT

A power distribution system having a continuous power bus to supply power and/or data to aircraft passenger seats in a mobile platform. The power distribution system generally includes a bus strip that extends along a length of the passenger cabin and a connector operable to provide a connection between the bus strip and the passenger seats. Power and/or data can be transmitted between the bus strip and the passenger seats, via the connector, at any point along the bus strip, thus eliminating the need to run separate connections between the power and/or data source and each passenger seat.

24 Claims, 4 Drawing Sheets

CONTINUOUS POWER BUS FOR SEAT POWER

FIELD OF THE INVENTION

The present invention relates to aircraft electronic systems. In particular, the present invention relates to a power bus that provides electricity to passenger seats in a mobile platform, such as an aircraft.

BACKGROUND OF THE INVENTION

Commercial aircraft passengers are increasingly demanding in-flight entertainment (IFE) and electrical power outlets to operate various electronic devices, such as laptop computers, at their seats. To provide the passenger with such features, electrical power and data must be delivered to each seat. Conventionally, power and data are delivered to aircraft passenger seats via numerous cables that, during aircraft assembly, are laid out in position on the floor of the aircraft passenger cabin. A portion of the cables is positioned beneath a covering, such as the seat track cover, and a portion that includes connectors for connection to the seats is left exposed to connect with the yet to be installed seat groups containing each passenger seat. During installation of the seat groups, the seat groups must be carried in over the exposed wires. Taking care to avoid the exposed wires increases both the complexity of the operation and the amount of time required to install the seats.

The seat groups can be arranged in various configurations and positions. As a result, a plurality of cables of various lengths and configurations are required to accommodate the desired seating configurations and positioning. The requirement for a variety of cables is expensive to purchase for initial installation and for spares. Additionally, when reconfiguring the seat groups or changing the positions, the existing cables may be inadequate and require re-wiring so that the wiring will reach the seats in their new positions. As would be expected, re-wiring an aircraft is a costly and time consuming process.

In view of the foregoing, it is desirable to provide an improved device for delivering power to aircraft passenger seat groups that will eliminate the need to separately connect each seat group to an individual power or data cable and the need to re-wire the power cables when the seat configuration is changed.

SUMMARY OF THE INVENTION

A power distribution system operable to supply power and/or data to passenger seats in a mobile platform. The power distribution system generally includes a power bus strip and a connector operable to provide a connection between the bus strip and the passenger seats. Power and/or data can be transmitted between the bus strip and the passenger seats, via the connector, at any point along the bus strip, thus eliminating the need to run separate connections between the power and/or data source and each passenger seat.

A power distribution system for use with a plurality of seats within a structure according to the principles of the present invention includes a bus strip having at least one conductive member therein. The bus strip has an access portion that allows access to the conductive member at any location along a length of the access portion. The bus strip extends along a portion of the structure adjacent seats within the structure. There is a connector which is operable to electrically interconnect the bus strip conductive member to a conductive member in a seat. The conductor has a plug member operable to be electrically connected to the bus strip conductive member through the access portion. The conductor has a cable which is operable to be connected to the seat conductive member.

An aircraft having a power distribution system according to the principle of the present invention includes a body having a passenger seating area and a plurality of seats in the seating area. There is a source operable to supply power and/or data. An elongated bus strip extends along a portion of the seating area. The bus strip has at least one continuous elongated receptacle that extends along an entirety of the bus strip. The receptacle includes a conductive member electrically connected to the source. A connector is selectively attachable to the bus strip at any location along the receptacle. The connector has a plug operable to be inserted into the receptacle and into electrical contact with the conductive member. The connector is electrically connected to at least one of the seats. The connector thereby electrically interconnects the conductive member to the seat.

A method of providing power and/or data to a seat in a passenger seating area of a mobile platform is disclosed. The method includes: (1) attaching an elongated bus strip having an elongated continuous receptacle in a desired location relative to the seating area, said receptacle having a conductive member therein; (2) attaching a connector to said bus strip at a position near the seat to which power and/or data is to be provided, said connector having a plug that engages with said conductive member when attached to said bus strip, said connector operable to electrically interconnect said conductive member to the seat; and (3) connecting said bus strip to a power and/or data source on the mobile platform.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of preferred embodiments is merely exemplary in nature and is in no way intended to limit the invention, its application, or uses.

Figure 1:
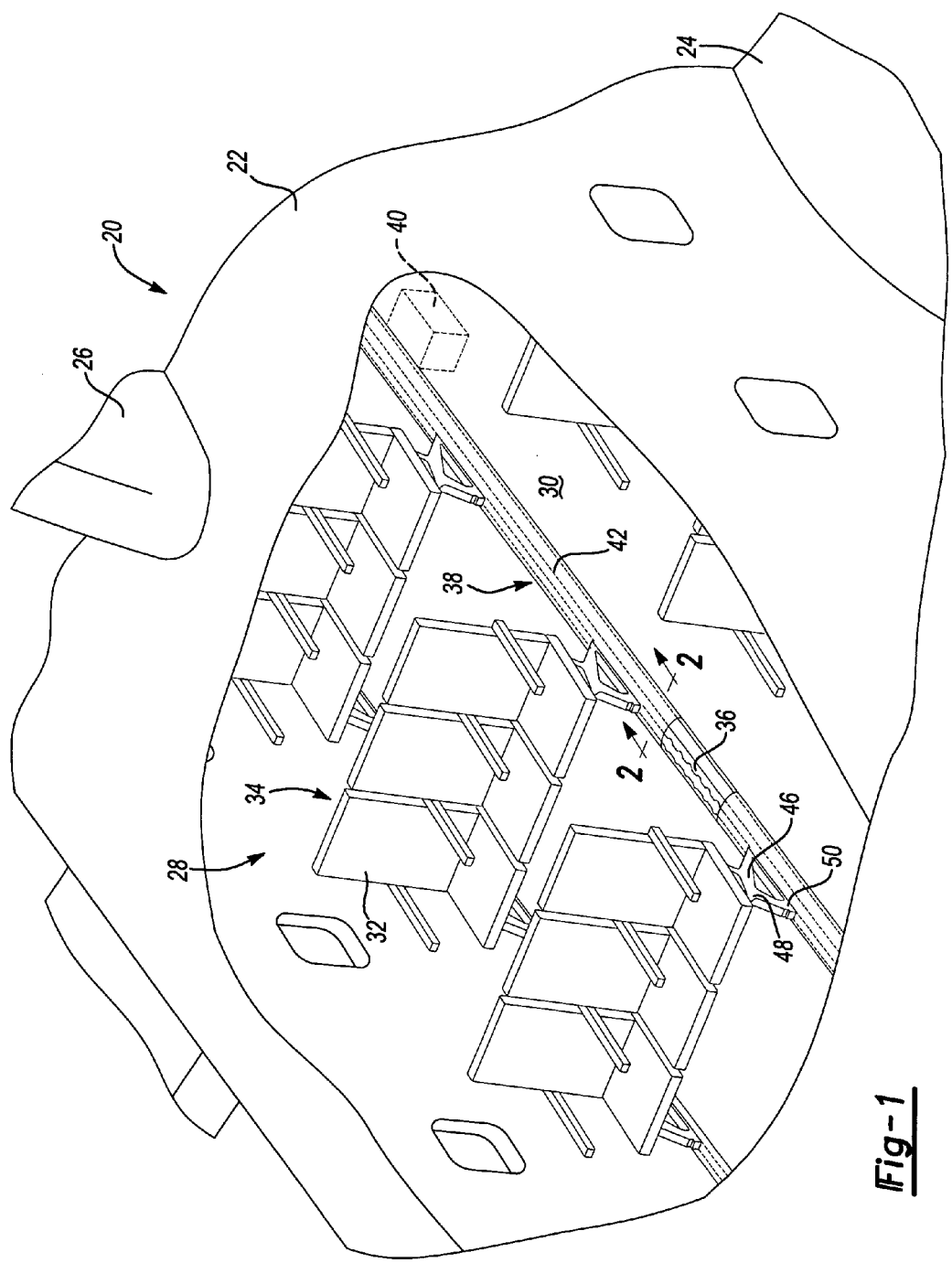
FIG. 1 is a partially cut-away view of an aircraft showing the aircraft passenger cabin outfitted with the power distribution system of the present invention.

With initial reference to FIG. 1, a mobile platform in the form of a passenger aircraft equipped with a power distribution system according to the present invention is illustrated at reference numeral 20. It will be appreciated, however, that the present invention is not limited to use only in commercial aircraft and can be implemented in any form of mobile platform, such as a ship, train, bus, rotor craft, etc. The invention can also be implemented in fixed structures having a plurality of seats, such as conference rooms, theaters, auditoriums, etc.

The aircraft 20 generally includes a fuselage 22, wings 24, and a tail fin 26. The fuselage 22 includes a passenger cabin 28 having a floor 30. At floor 30 are numerous passenger seats 32. Two or more passenger seats 32 are grouped together as a seat group 34. One or more seat tracks 36 extend along floor 30 to secure seat groups 34 into position. A power distribution system 38 for delivering power and/or data to seats 32 extends along side of, or closely adjacent to, one or more of the seat tracks 36. Power distribution system 38 connects to a power and/or data source 40 (hereinafter referred to as power source 40). Seat tracks 36 and power distribution system 38 are typically covered by a seat track cover 42.

Figure 2:
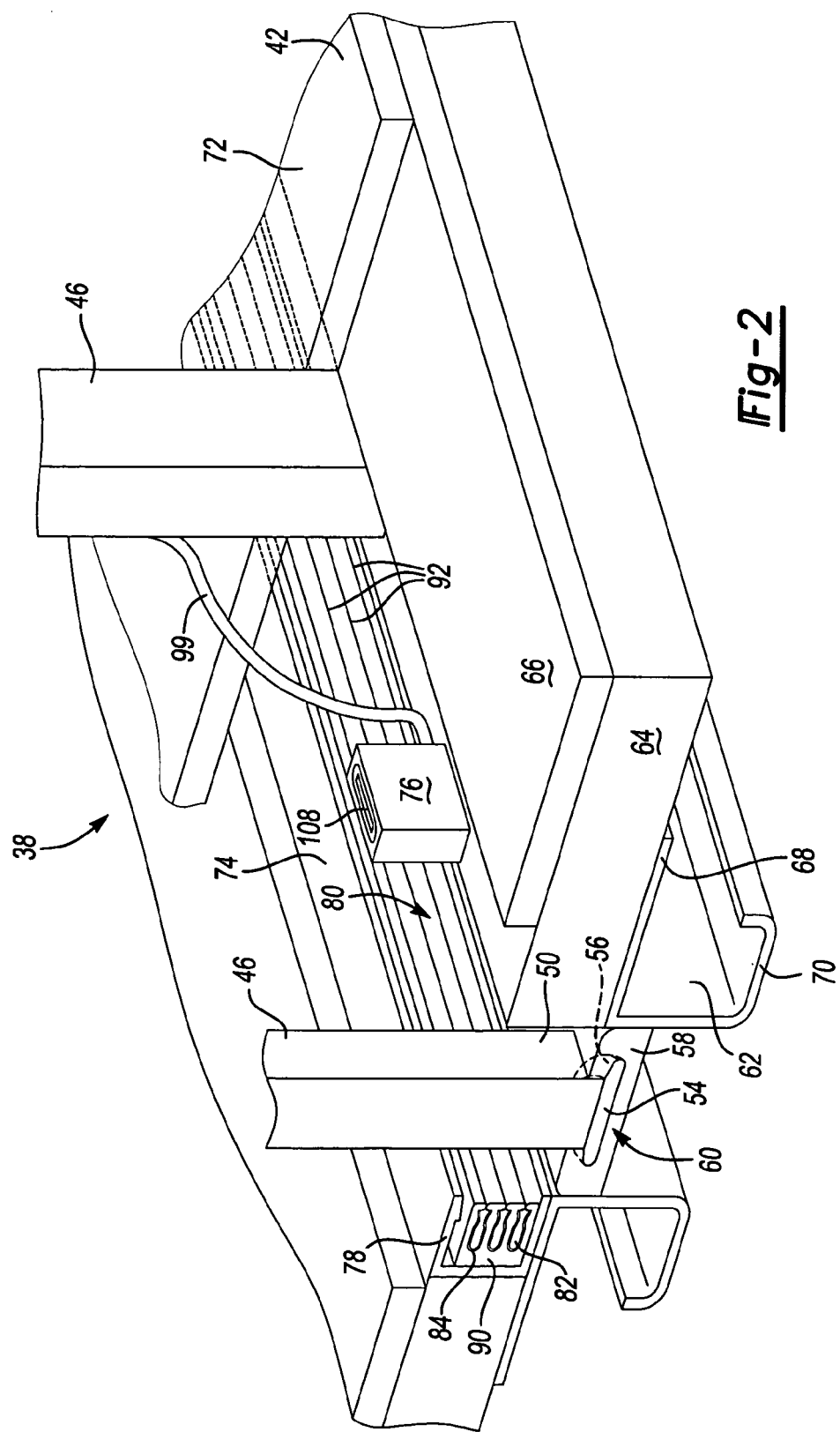
FIG. 2 is a partial cross-sectional view of the power distribution system of FIG. 1 along line 2—2.

With continued reference to FIG. 1 and additional reference to FIG. 2, each seat group 34 includes legs 46 that provide support to the different passenger seats 32. Legs 46 include an upper portion 48 and a lower portion 50. Upper portion 48 mates with or can be integrated with seats 32. Lower portion 50 includes a any conventional fastening device capable of securing seat group 34 to seat track 36. For example, a tab 54 for cooperating with seat track 36 can be used, as described in further detail below. Tab 54 can be, for example, round, square, or rectangular, to be securely received by seat track 36.

Seat track 36 includes a pair of extensions 56 that extend upwardly from a base portion 58 and define a channel 60 therebetween. Tab 54 of legs 46 fit within channel 60 and allows seat group 34 to be slid along seat track 36 to a desired position and then secured in that position. Seat track 36 is positioned between floor supports 62 which support floor 30. Specifically, floor 30 includes a floor panel 64 and a carpet layer 66. Floor panel 64 is supported by floor supports 62. Floor supports 62 include an upper member 68 upon which floor panel 64 rests and a lower member 70 which is attached to a fuselage floor beam (not shown).

With continued reference to FIGS. 1 and 2, seat track cover 42 is an elongated strip for covering seat track 36 and power distribution system 38. Seat track cover 42 has a top surface 72 that extends across the tops of carpet layer 66 and a lower portion (not shown) that may engage with seat track 36 to secure seat track cover 42 in position or, alternatively, cover 42 can be secured to floor panel 64 or carpet 66. Seat track cover 42 also includes openings or discontinuities in top surface 72 to accommodate legs 46 of frame 44 and to allow power distribution system 38 to provide power to seat groups 34.

Figure 3:
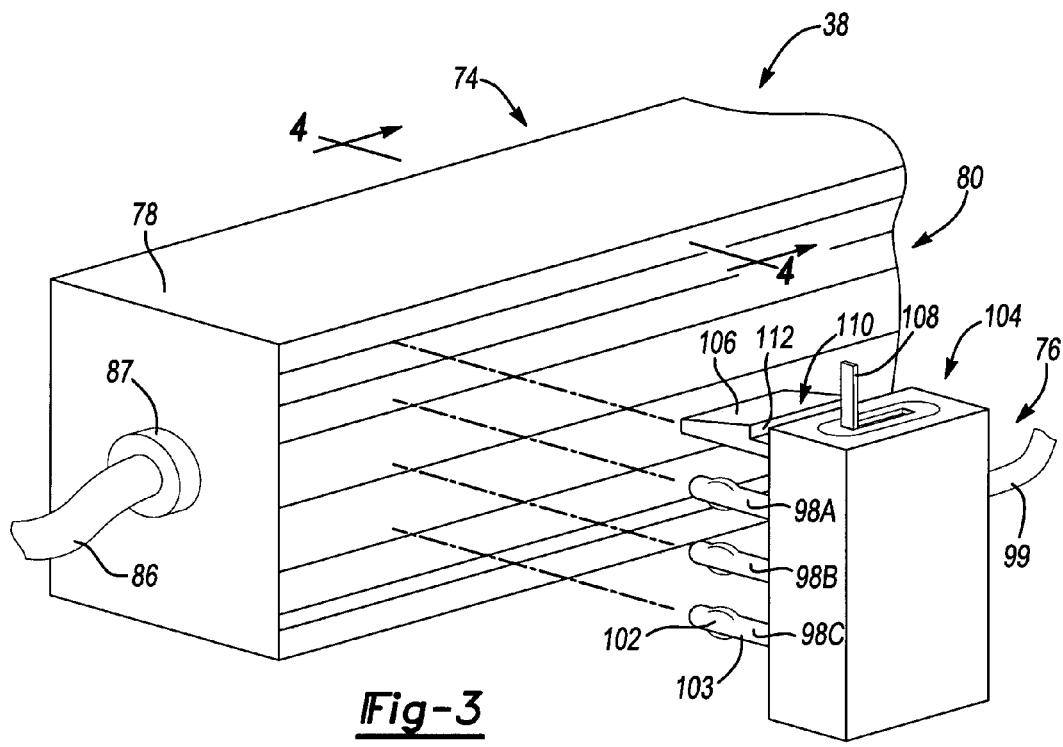
FIG. 3 is an enlarged perspective view of the bus strip and connector of the power distribution system according to the principles of the present invention.
Figure 4:
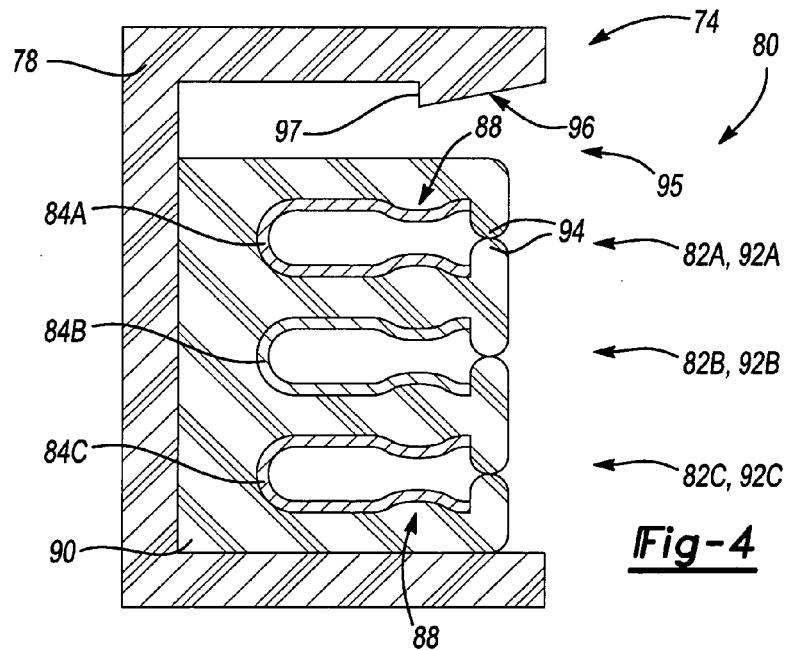
FIG. 4 is a cross-sectional view of the bus strip of FIG. 3 along line 4—4.

With continued reference to FIGS. 1 and 2 and additional reference to FIGS. 3 and 4, power distribution system 38 generally includes a power bus strip 74 and multiple connectors 76 that each interconnect bus strip 74 with one of the seat groups 34. Bus strip 74 generally includes an elongated housing 78 that can be attached to upper member 68 of floor support 62. Housing 78 can be made from a variety of materials, such as metal or plastic. Preferably, housing 78 is nonconductive and made of a plastic. When housing 78 is electrically conductive it is grounded. Housing 78 includes an access portion or side 80 that extends along an entirety of the length of bus strip 74. Access portion 80 allows access to continuous receptacles 82 that extend along an entirety of a length of access portion 80 and bus strip 74. Each receptacle 82 includes an electrically conductive member 84 that is electrically connected to a cable 86 that extends from bus strip 74 and is connected to power source 40. Thus, each conductive member 84 is connected to power source 40 via cable 86. Cable 86 can extend from bus strip 74 at either end or in an intermediate location between the ends. Cable 86 extends through a grommet 87 or other protective device to seal cable 86 to housing 78 to prevent liquid or debris from entering into housing 78 through the cable opening. Cable 86 will extend from bus strip 74 at a location that facilitates the connection of cable 86 to power source 40. Each conductive member 84 is made from a conductive material, such as copper.

Conductive members 84 can include a locking detail 88 that is operable to removably secure connector 76 to bus strip 74, described in more detail below, if desired. Each receptacle 82 is contained within a nonconductive retainer 90. Retainer 90 has a slot 92 for each receptacle 82 to allow access to the conductive member 84 therein. Slot 92 extends along an entire length of receptacle 82 to allow access to receptacle 82 at any location along the length of bus strip 74. Each slot 92 is formed by a pair of resilient fingers 94 that oppose and are in contact with one another. The contact between fingers 94 provides a seal that protects conductive members 84 and prevents the ingress of liquids or other contaminates into receptacles 82 in bus strip 74. Fingers 94 allow insertion of and seal around plugs 98 in connector 76 when connector 76 is being attached to bus strip 74. The insertion of plugs 98 into receptacles 82 causes fingers 94 to elastically deform. When connector 76 is removed from bus strip 74, fingers 94 return to their nominal state and seal slot 92 to prevent liquids or other contaminates from getting into receptacles 82. Fingers 94 are integral with retainer 90. Retainer 90 and fingers 94 can be made from a variety of materials, such as elastomeric material and plastic. Preferably, retainer 90 and fingers 94 are made from an elastomeric material, such as rubber. If desired, fingers 94 and retainer 90 can be made from different types of materials to provide desired properties for the different portions of retainer 90. While retainer 90 is shown as being a single retainer that retains each of the receptacles 82, it should be appreciated that each receptacle 82 could have its own individual retainer that is a distinct and separate component from the other retainers, if desired.

In addition to or as an alternative to conductive members 84 having a locking detail 88, bus strip 74 can include a retaining slot 95 that is operable to allow connector 76 to be removably secured to bus strip 74. Retaining slot 95 includes a sloped surface 96 and a shoulder portion 97 that are used to removably secure connector 76 to bus strip 74. The interaction of connector 76 and retaining slot 95 is described in more detail below.

As illustrated, bus strip 74 includes a first conductive member 84A in communication with power source 40 to carry power from power source 40, a second conductive member 84B that is in communication with power source 40 to return power to power source 40, and a third conductive member 84C to ground power strip 74 by connecting to a ground within power source 40 or to a suitable grounding surface. It should be appreciated, however, that conductive members 84 can provide other power or data to the seat groups. For example, conductive members 84 can be used to supply data, as described in more detail below, additionally, conductive members 84A and 84B can be used to supply two different phases of AC current and conductive member 84C acting as a ground. Power source 40 can be a dedicated battery for supplying power to passenger seats 32 or can be connected to the general aircraft power supply. Power source 40 can include electrical contacts (not shown) that make electrical contact with the appropriate conductive members 84 via cable 86. Preferably, power source 40 is operable to provide a nominal 115 volts of AC current at 400 hertz to seats 32 although other voltages, frequencies, and DC current can be supplied, if desired. The size of conductive members 84 and cable 86 are selected to carry the desired current and so that the voltage drop over the length of bus strip 74 is constrained to an acceptable level.

Connector 76 includes a plurality of plugs 98 and is configured to be removably attached to bus strip 74. Connector 76 is nonconductive and can be made from a variety of materials. Preferably, connector 76 is made of plastic. Plugs 98 are conductive and are preferably made from a metal, such as copper. Plugs 98 are arranged to align with receptacles 82 when connector 76 is attached to bus strip 74. Plugs 98 are electrically conductive and are electrically connected to a cable 99 that extends from connector 76. On the other end of cable 99 there is a plug 100 that is configured to mate with a complementary receptacle 101 on seat group 34. Alternatively, as discussed below, connector 76 can be integral to seat group 34 with cable 99 already attach to the associated components within the seat group. Plugs 98 can take a variety of forms. For example, plugs 98 can be cylindrical pins, as shown, or can be flat rectangular blades (not shown). Plugs 98 and receptacles 82 are configured to be complementary to one another so that a good reliable electrical connection can be achieved between plugs 98 and receptacles 82 when connector 76 is attached to bus strip 74. As stated above, receptacles 82 can have a locking detail 88, which is in the form of a narrowed or restricted passageway in conductive member 84. When locking detail 88 is present, plugs 98 preferably have an end or head portion 102 that is larger than a stem portion 103. With this configuration, locking detail 88 secures plug 98 within receptacle 82 by pinching stem portion 103 after head portion 102 has passed through locking detail 88. The interaction between locking detail 88 and head 102 helps prevent inadvertent removal of connector 76 from bus strip 74 but does not prevent removal when an adequate force is applied to connector 76.

Connector 76 can include a retaining mechanism 104 that allows connector 76 to be removably secured to bus strip 74 when bus strip 74 has retaining slot 95. Retaining mechanism 104 includes an engagement member 106 and a lever 108. The end of engagement member 106 has a sloped surface 110 and a shoulder 112. Engagement member 106 aligns with and is in inserted into retaining slot 95 of bus strip 74. Sloped surface 110 may engage with the sloped surface 96 in retaining slot 95 when connector 76 is being connected to bus strip 74. Lever 108 is operable between a releasing position (FIG. 3) and a retaining position (FIG. 2). Movement of lever 108 between the releasing and retaining positions moves engagement member 106 upwardly and toward connector 76. In contrast, when lever 108 is moved from the retaining position to the releasing position, engagement member 106 moves downwardly and away from connector 76. The movement of engagement member 106 allows connector 76 to be selectively secured to bus strip 74, as described below. Retaining mechanism 104 is nonconductive and preferably made of a plastic.

When connector 76 is attached to bus strip 74, plugs 98 align with and insert into associated receptacle 82 through slots 92 and engagement member 106 aligns with inserts into retaining slot 95. Depending upon the alignment between connector 76 and bus strip 74, sloped surface 110 of engagement member 106 may engage with sloped surface 96 of retaining slot 95 to facilitate the positioning of engagement member 106 properly within retaining slot 95 when connector 76 and bus strip 74 are not completely aligned. With connector 76 engaged with bus strip 74, lever 108 can then be moved to the engagement position which causes engagement member 106 to move upwardly and toward connector 76. The movement of engagement member 106 causes shoulder 112 of engagement member 106 to engage with the shoulder 97 in retaining slot 95. The engagement of shoulders 112, 97 secures connector 76 to bus strip 74. When it is desired to remove connector 76 from bus strip 74, lever 108 is moved from the engaged position to the release position which moves engagement member 106 away from connector 76 and downward to disengage shoulders 112, 97. Connector 76 can then be removed from bus strip 74.

Figure 5:
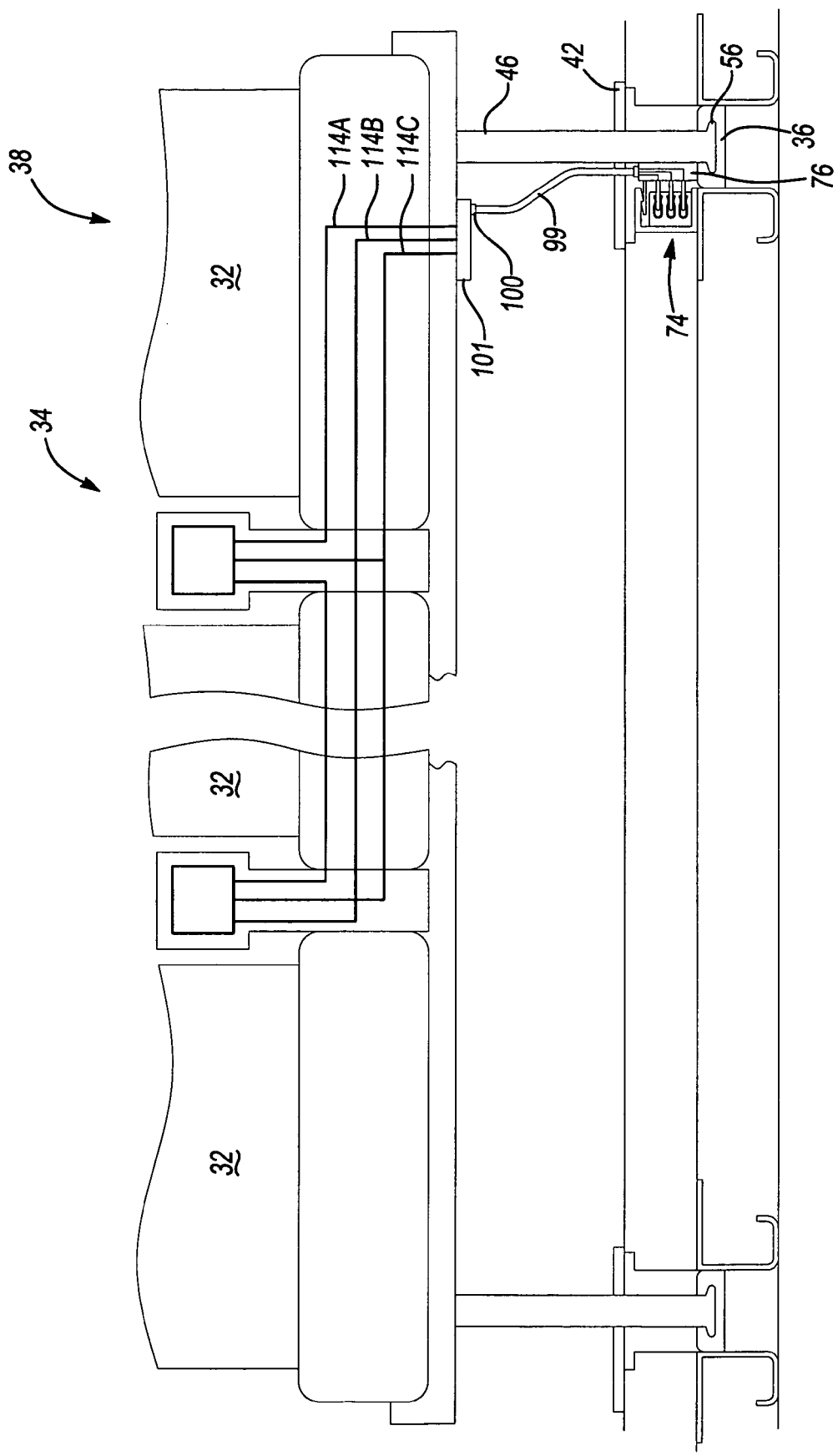
FIG. 5 is a schematic view illustrating an exemplary wiring configuration of the present invention.

With additional reference to FIG. 5, the connection of cable 99 on connector 76 to receptacle 101 on seat group 34 electrically interconnects receptacles 82 with respective wires 114 on seat group 34. Wires 114 extend from receptacle 101 up to seats 32. A first wire 114A is in electrical contact with first receptacle 82A, a second wire 114B is in electrical contact with second receptacle 82B, and a third wire 114C is in electrical contact with third receptacle 82C via connector 76. Wires 114 are also connected to various components on seats 32 of seat group 34, as determined by the features being offered within each seat group 34. For example, wires 114 can extend to power outlets for each seat 32 thereby enabling a passenger residing within that seat to have an available power supply for their use. Additionally, wires 114 can be supplied to display screens to display requested information and/or to provide power to the display screen (not shown). Alternatively and/or additionally, receptacle 101 can be connected to various components, such as an AC to DC converter, single conditioner, or the like from which wires 114 extend to their associated components. Thus, power distribution system 38 can be utilized to provide power or data from power source 40 to individual seats 32 throughout passenger cabin 28.

The cooperation of the above components and their operation will now be described in detail. Seat track 36 is generally positioned just beneath or at the surface of floor 30 and extends the length of, or at least a portion of the length of, passenger cabin 28. Aircraft 20 can include any number of seat tracks 36 depending upon the application. In some applications, two seat tracks 36 are provided to support each seat group 34 at floor 30. Seat track 36 is typically held in position by securing seat track 36 to floor support 62 in any suitable manner.

With seat tracks 36 secured in position, bus strips 74 can be installed. Bus strips 74 are positioned adjacent one or more seat track 36 on upper member 68 of floor support 62. Bus strips 74 are flush with the top surface or slightly recessed from the top surface of floor 30. Bus strip 74 is oriented so that access portion 80 is open toward seat track 36. Bus strip 74 extends an entire length of, or at least a portion of the length of, passenger cabin 28. Cable 86 on bus strip 74 is attached to power source 40 either via complementary receptacles or by connecting the individual wires within cable 86 to various connectors within power source 40. Alternatively, cable 86 can be connected to an intermediate cable or component which is connected to power source 40. Bus strip 74 is preferably removably secured to floor supports 62 or floor panel 64. Bus strip 74 can be secured floor supports 62 in a variety of ways. For example, a hook-and-loop fastener system, such as Velcro®, can be used, clips (not shown) that snap into complementary recesses or openings (not shown) within floor supports 62 or floor panel 64, or the like can be utilized. Optionally, reinforcing members (not shown) or attachment members may be positioned at various lengths along bus strip 74. Use of these reinforcing or attachment members may prevent connector 76 from being installed at some positions along bus strip 74, however, the intrusion of these members is minimal and the functionality of bus strip 74 providing continuous receptacles for attaching a connector 76 may still be substantially achieved.

With bus strip 74 positioned in place, seat groups 34 containing passenger seats 32 are installed. Seat groups 34 are positioned above seat tracks 36 such that legs 46 of each seat group 34 are aligned with seat tracks 36. Generally, fastening tab 54 of seat legs 46 is, at its widest point, wider than the distance between extensions 56 of seat track 36 that engage with tabs 54. However, at various apertures along the length of seat track 36, the distance between extensions 56 increases to permit passage of tabs 54. It is at these regions that fastening tabs 54 are inserted past extensions 56 and into channel 60 of seat track 36. Seat group 34 is then moved along seat track 36 such that tab 54 is moved to a point in seat track 36 where the distance between extensions 56 is less than the width of tab 54 to lock tab 54, and thus seat group 34, to seat track 36. To ensure that tab 54 does not return to the area of seat track 36 where the distance between extensions 56 is widened, seat leg 46 is secured into position along seat track 36 in any conventional manner, such as by a bolt.

With at least one seat group 34 secured in its desired position, seat group 34 can then be connected to power source 40 via power distribution system 38. Preferably, connector 76 is attached to seat group 34 prior to seat group 34 being installed into aircraft 20. That is, it is preferred that connector 76 be preassembled along with seat group 34 at the manufacturer of seat group 34 such that when seat group 34 is to be installed within aircraft 20, connector 76 is already part of seat group 34. In this manner, installation of seat group 34 and connecting seat group 34 to power distribution system 38 is facilitated. Additionally, connector 76 can be configured to provide the power and/or data streams to seat group 34 for the configuration of a particular seat group. That is, different seat groups may have different power sources and/or data content available for their use. Connector 76 that comes preassembled with seat group 34 and is configured to tap into or connect to the appropriate power lines and/or data lines within bus strip 74. Alternatively, connector 76 can be a separate component that is not attached to seat group 34. In this instance, connector 76 will need to be connected to seat group 34 via cable 99 after seat group 34 is secured in position within aircraft 20.

In either configuration, connector 76 is positioned adjacent bus strip 74 and on top of seat track 36 between front and back legs 46. Connector 76 is aligned with bus strip 74 so that engagement member 106 is aligned with retaining slot 95 and each plug 98 is aligned with the associate slot 92 and receptacle 82. Connector 76 is then moved toward bus strip 74 and into engagement therewith. It is anticipated that connector 76 can be installed by hand by a worker on aircraft 20. However, if desired, a tool can be employed to exert leverage and move connector 76 into engagement with bus strip 74. For example, connector 76 can be attached to a lever or similar device on leg 46 and movement of the lever causes connector 76 to move toward and attach to bus strip 74. When connector 76 is engaged with bus strip 74, if so equipped, lever 108 can be moved to its engaged position to cause engagement member 106 to engage with retaining slot 95 to secure connector 76 to bus strip 74. With connector 76 secured to bus strip 74 either by retaining mechanism 104 or locking detail 88, cable 99, if not previously installed as part of seat group 34, can then be attached to receptacle 101 in seat group 34. If desired, however, cable 99 can be attached to receptacle 101 of seat group 34 prior to attaching connector 76 to bus strip 74.

With seat group 34 now connected to power source 40 via power distribution system 38, the next seat group 34 can then be installed and connected to power source 40 in the same manner. Alternatively, if desired, each seat group 34 can be installed into its desired position prior to connecting each seat group 34 to power source 40 with power distribution system 38.

Finally, with seat group 34 secured in position and connected to power source 40 via power distribution system 38, seat track cover 42 is inserted over seat track 36 and bus strip 74. To accommodate seat legs 46 and cable 99, a section of seat track cover 42 is removed. Seat track cover 42 is secured to floor 30 using any suitable adhesive or mechanical fastening device.

It should be appreciated that while power distribution system 38 is described as distributing power to passenger seats 32, system 38 can also be used to distribute data to passenger seats 32. For example, data distribution can be performed using conventional communication over power line systems.

It should also be appreciated that passenger cabin 28 can be outfitted with multiple power distribution systems 38 at each seat group 34. The multiple power distribution systems 38 can be provided at the same seat track 36 or different seat tracks 36. The use of multiple power distribution systems 38 is useful to provide separate power bus systems for both power and data. Further, a first power distribution system 38 at seat track 36 can be used for current delivery and a second power distribution system 38 can be used as a current return. Still further, the use of a second power distribution system 38 can be used to supply additional current to seat groups 34.

Power distribution system 38 can also include a data only optical strip (not shown) housed within housing 78. The optical strip can be any conventional optical data line. For example, the optical strip can be made by co-extruding opaque plastic over clear plastic to make a light guide. High-bandwidth data can be sent to seat groups 34 using conventional "light guide" technology, or any other short-range fiber optic technology. This high-bandwidth data is received by each seat group 34 and each seat 32 by conventional high-bandwidth receiver or connector.

Power distribution system 38 can further include a data strip (not shown) that carries both optical data and electrical current. For example, a clear plastic with sufficiently high dielectric to insulate a power conductor, such as polyethylene can be co-extruded around one or more conductive members 84 with a clear plastic interior and an opaque plastic exterior. Data can be transmitted through the plastic portion using, for example, conventional "light guide" technology or any other short-range fiber optic technology, and electrical current can be conducted through the conductive member 84. By adding a conventional optical tap (not shown) to plug 98, a single conductive member 84 can be used to transmit both power and optical data.

It should be appreciated that while bus strip 74 is shown as having three receptacles 82 with three conductive members 84 therein, bus strip 74 can have more or less number of receptacles and conductive members. Furthermore, it should be appreciated that connector 76, while shown as having a complementary number of plugs 98 as there are receptacles 82 in bus strip 74 can have less than the entire number of receptacles 82, if desired. For example, when bus strip 74 has numerous receptacles 82 and the particular seat group 34 that is tapping into power distribution system 38 does not require the use of all the different receptacles 82, connector 76 will be configured to only tap into the receptacles 82 that are needed to provide the services to the particular seat group 34. Additionally, while two different ways of securing connector 76 to bus strip 74 (locking detail 88 and retaining mechanism 104) are shown and discussed, other methods of releasably securing connector 76 to bus strip 74 can be employed.

Thus, a power distribution system 38 according to the principles of the present invention enables the positioning of seat groups 34 within passenger cabin 28 without the necessity of avoiding or worrying about damaging cables extending from floor 30. Furthermore, a power distribution system 38 according to the principles of the present invention allows each seat group 34 to be easily connected to power source 40 via connector 76 and bus strip 74 regardless of the positioning of seat group 34 along seat track 36. Additionally, a power distribution system 38 according to the principles of the present invention allows for the arrangement and configurations of seat groups 34 to be altered without requiring the rewiring of passenger cabin 28. The ability to attach connector 76 at any point along bus strip 74 due to the continuous receptacles 82 extending therealong, facilitates these advantages.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An aircraft comprising:
a fuselage having a passenger seating area;
a plurality of seats in said seating area;
a source operable to supply electrical power and/or data;
an elongated bus strip extending along a portion of said seating area, said bus strip having at least one continuous elongated receptacle having an elongated accessible first side that extends along an entirety of said bus strip, said receptacle including a conductive member electrically connected to said source; and
a connector selectively attachable to said bus strip at any location along said first side of said receptacle by insertion without rotation into said first side of said receptacle, said connector having an electrically conductive plug operable to be inserted into said first side of said receptacle and into electrical contact with said conductive member without rotation, said connector also being electrically connected to at least one of said seats, said connector thereby electrically interconnecting said conductive member to said seat,
wherein said seating area includes at least one seat track that extends alone a portion of said seating area, said seat track allowing said seats to be located at a variety of positions along said seat track, and said bus strip extends along said seat track with said first side facing said seat track.

2. The aircraft of claim 1, wherein each seat is part of a seat group and said connector is electrically connected to a seat group.

3. The aircraft of claim 1, wherein said bus strip resides flush with or below a floor of said seating area.

4. The aircraft of claim 3, wherein said bus strip is at least partially covered by a seat track cover.

5. The aircraft of claim 4, wherein said seat track cover covers a portion of a top surface of said floor of said seating area.

6. The aircraft of claim 1, wherein said connector includes a retaining mechanism that selectively secures said connector to said bus strip.

7. The aircraft of claim 1, wherein said receptacle has a locking detail that releasably engages with said plug to selectively attach said connector to said strip.

8. The aircraft of claim 7, wherein said connector includes a retaining mechanism that releasably secures said connector to said bus strip, said retaining mechanism being a distinct and separate mechanism from said locking detail.

9. The aircraft of claim 7, wherein said locking detail includes a narrowing passageway that allows access to said conductive member.

10. The aircraft of claim 1, wherein said bus strip has a plurality of receptacles each having a conductive member therein and a first of said receptacles is a current supply, a second of said receptacles is current return and a third of said receptacles is a ground.

11. The aircraft of claim 1, wherein said bus strip includes a retainer that supports said receptacle and said conductive member, said retainer providing a protective enclosure for said conductive member, and said retainer having a slot through which said plug is inserted to connect to said conductive member.

12. The aircraft of claim 1, wherein said plurality of seats include groups of seats and said connector is one of a plurality of connectors that are integral with said groups of seats.

13. An aircraft comprising:
a fuselage having a passenger seating area;
a plurality of seats in said seating area;
a source operable to supply electrical power and/or data;
an elongated bus strip extending along a portion of said seating area, said bus strip having at least one continuous elongated receptacle having an elongated accessible first side that extends along an entirety of said bus strip, said receptacle including a conductive member electrically connected to said source; and
a connector selectively attachable to said bus strip at any location alone said first side of said receptacle by insertion without rotation into said first side of said receptacle, said connector having an electrically conductive plug operable to be inserted into said first side of said receptacle and into electrical contact with said conductive member without rotation, said connector also being electrically connected to at least one of said seats, said connector thereby electrically interconnecting said conductive member to said seat,
wherein said receptacle has a locking detail that releasably engages with said plug to selectively attach said connector to said strip, said locking detail includes a narrowing passageway that allows access to said conductive member, and said plug includes a stem with an enlarged head and wherein said head passes through said narrowing passageway when attaching said connector to said bus strip.

14. An aircraft comprising:
a fuselage having a passenger seating area;
a plurality of seats in said seating area;
a source operable to supply electrical power and/or data;
an elongated bus strip extending along a portion of said seating area, said bus strip having at least one continuous elongated receptacle having an elongated accessible first side that extends along an entirety of said bus strip, said receptacle including a conductive member electrically connected to said source; and
a connector selectively attachable to said bus strip at any location along said first side of said receptacle by insertion without rotation into said first side of said receptacle, said connector having an electrically conductive plug operable to be inserted into said first side of said receptacle and into electrical contact with said conductive member without rotation, said connector also being electrically connected to at least one of said seats, said connector thereby electrically interconnecting said conductive member to said seat,
wherein said connector is disposed between said bus strip and said seat track when attached to said bus strip.

15. An aircraft comprising:
a fuselage having a passenger seating area;
a plurality of seats in said seating area;
a source operable to supply electrical power and/or data;
an elongated bus strip extending along a portion of said seating area, said bus strip having at least one continuous elongated receptacle having an elongated accessible first side that extends along an entirety of said bus strip, said receptacle including a conductive member electrically connected to said source; and
a connector selectively attachable to said bus strip at any location along said first side of said receptacle by insertion without rotation into said first side of said receptacle, said connector having an electrically conductive plug operable to be inserted into said first side of said receptacle and into electrical contact with said conductive member without rotation, said connector also being electrically connected to at least one of said seats, said connector thereby electrically interconnecting said conductive member to said seat,
wherein said receptacle includes an access opening along said first side that is sealed closed with a resilient material.

16. An aircraft comprising:
a fuselage having a passenger seating area;
a plurality of seats in said seating area;
a seat track in said seating area and extending along a portion of said seating area, said seat allowing said seats to be located at a variety of positions along said seat track;
a floor in said seating area;
a source operable to supply electrical power and/or data;
an elongated bus strip extending along a portion of said seating area, said bus strip having at least one continuous elongated receptacle having an accessible first side that extends along an entirety of said bus strip, said receptacle including a conductive member electrically connected to said source, and said bus strip resides flush with or below said floor of said seating area; and
a connector selectively attachable to said bus strip at any location along said first side of said receptacle, said connector having an electrically conductive plug operable to be inserted into said first side of said receptacle and into electrical contact with said conductive member, said connector also being electrically connected to at least one of said seats, said connector thereby electrically interconnecting said conductive member to said seat,
wherein said connector is disposed between said bus strip and said seat track when attached to said bus strip.

17. The aircraft of claim 16, wherein said receptacle includes an access opening along said first side that is sealed closed with a resilient material.

18. An aircraft comprising:
a fuselage having a passenger seating area;
a plurality of seats in said seating area;
a seat track in said seating area and extending alone a portion of said seating area, said seat allowing said seats to be located at a variety of positions along said seat track;
a floor in said seating area;
a source operable to supply electrical power and/or data;
an elongated bus strip extending along a portion of said seating area, said bus strip having at least one continuous elongated receptacle having an accessible first side that extends along an entirety of said bus strip, said receptacle including a conductive member electrically connected to said source, and said bus strip resides flush with or below said floor of said seating area; and
a connector selectively attachable to said bus strip at any location along said first side of said receptacle, said connector having an electrically conductive plug operable to be inserted into said first side of said receptacle and into electrical contact with said conductive member, said connector also being electrically connected to at least one of said seats, said connector thereby electrically interconnecting said conductive member to said seat,
wherein said first side faces said seat track.

19. The aircraft of claim 18, wherein said seat track resides flush with or below said floor of said seating area.

20. The aircraft of claim 19, further comprising a seat track cover at least partially covering said bus strip and said seat track and covering a portion of a top surface of said floor of said seating area.

21. An aircraft comprising:
a fuselage having a passenger seating area;
a plurality of seats in said seating area;
a seat track in said seating area and extending along a portion of said seating area, said seat allowing said seats to be located at a variety of positions along said seat track;
a source operable to supply electrical power and/or data;
an elongated bus strip extending along a portion of said seating area, said bus strip having at least one continuous elongated receptacle having an accessible first side that extends along an entirety of said bus strip, said receptacle including a conductive member electrically connected to said source;
a connector selectively attachable to said bus strip at any location along said first side of said receptacle, said connector having an electrically conductive plug operable to be inserted into said first side of said receptacle and into electrical contact with said conductive member, said connector also being electrically connected to at least one of said seats, said connector thereby electrically interconnecting said conductive member to said seat;
a locking detail in said receptacle that releasably engages with said plug to selectively attach said connector to said strip; and
a retaining mechanism that releasably secures said connector to said bus strip, said retaining mechanism being a distinct and separate mechanism from said locking detail,
wherein said locking detail includes a narrowing passageway that allows access to said conductive member, said plug includes a stem with an enlarged head, and said head passes through said narrowing passageway when attaching said connector to said bus strip.

22. The aircraft of claim 21, wherein said connector is disposed between said bus strip and said seat track when attached to said bus strip.

23. The aircraft of claim 21, wherein said receptacle includes an access opening along said first side that is sealed closed with a resilient material.

24. The aircraft of claim 21, wherein said plurality of seats include groups of seats and said connector is one of a plurality of connectors that are integral with said groups of seats.

* * * * *